United States Patent [19]
Glass

[11] 3,727,077
[45] Apr. 10, 1973

[54] SMALL-CURRENT INTEGRATOR
[75] Inventor: Floyd M. Glass, Oak Ridge, Tenn.
[73] Assignee: The United States of America as represented by the United States Atomic Energy Commission
[22] Filed: Aug. 25, 1971
[21] Appl. No.: 174,838

[52] U.S. Cl............................307/229, 328/127
[51] Int. Cl..................................G06g 7/12
[58] Field of Search................307/229, 230, 254; 328/127; 235/183

[56] References Cited
UNITED STATES PATENTS
3,491,253   1/1970   Glass....................307/229

Primary Examiner—Donald D. Forrer
Assistant Examiner—B. P. Davis
Attorney—Roland A. Anderson

[57] ABSTRACT

An integrating circuit for quantizing currents as small as $10^{-12}$ ampere is set forth. The over-all integrating principle is fairly conventional. However, a much simplified and improved charge removal technique and an electrometer-type operational amplifier having common-mode feedback for stabilization in the event of radiation damage substantially improves operation.

4 Claims, 3 Drawing Figures

INVENTOR.
Floyd M. Glass

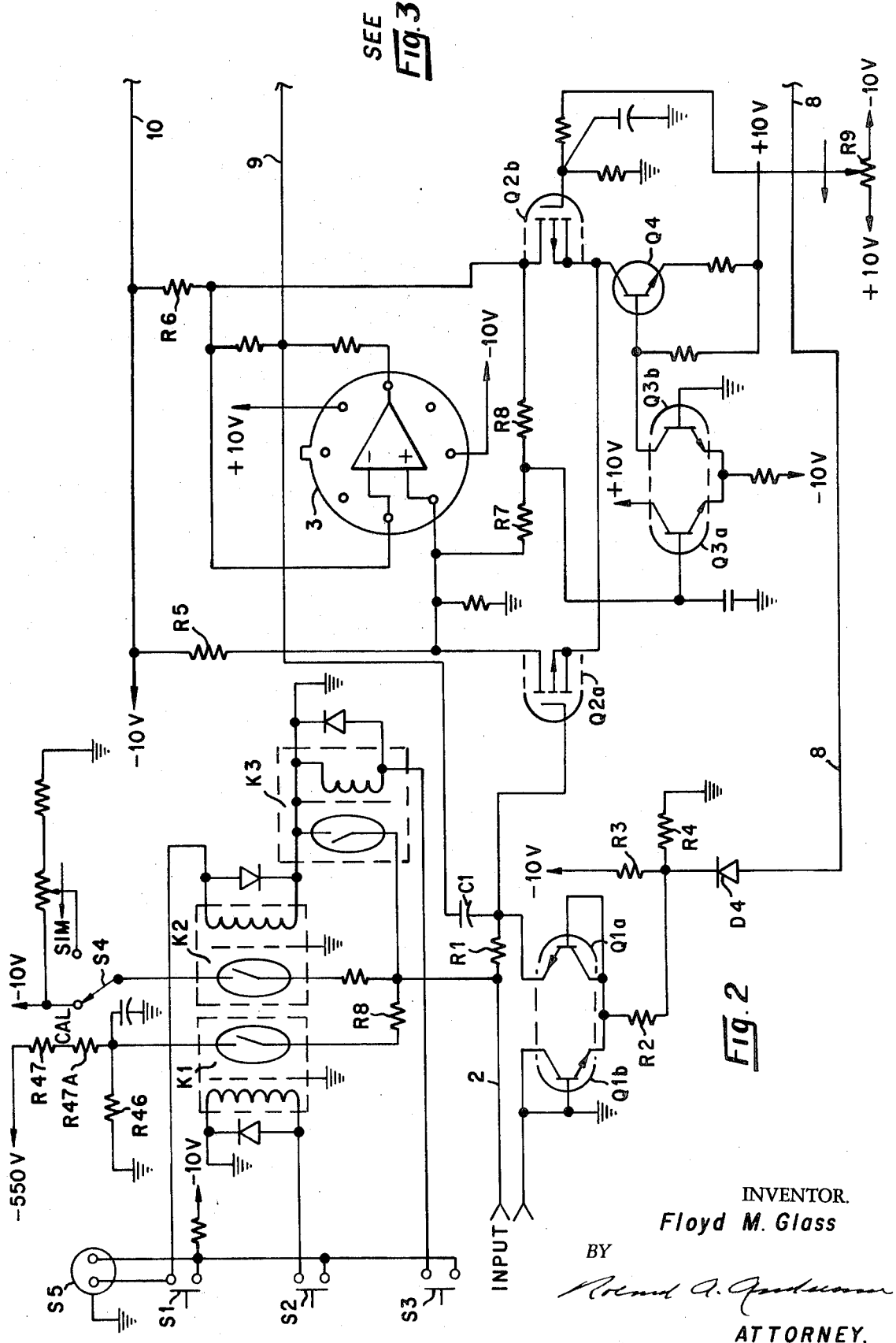

INVENTOR.
Floyd M. Glass
BY
ATTORNEY

SMALL-CURRENT INTEGRATOR

BACKGROUND OF THE INVENTION

The invention described herein was made in the course of, or under, a contract with the United States Atomic Energy Commission.

In the electronic art there is an ever-increasing need for the measurement of very small currents. These currents may be derived, for example, from radiation and/or particle detectors used in high energy physics, etc. It is often desired to determine the total charge or integrated current and it has been common practice in the prior art to accumulate the charge on a capacitor and then remove it in discrete "bits" and count the number of bits as a measure of the total integrated current.

Ion chambers are ideally suited for wide-range gamma monitoring because of their excellent spectral response and extremely wide linear response. However, it is difficult to obtain adequate long-term stability and dynamic range in the associated small-current high-impedance electronic circuitry utilized for measuring the total integrated current.

The present invention is an improvement over the system described in my prior U.S. Pat., No. 3,491,253, issued Jan. 20, 1970, and entitled "Current Integrator," and having a common assignee with the present application. In addition to overcoming the disadvantages of the prior art as discussed in my above prior patent, the present invention is considerably less complicated than the technique employed in that patent while at the same time will efficiently integrate currents which are smaller than those which can be integrated with the above prior patent in a manner to be described hereinbelow.

SUMMARY OF THE INVENTION

It is the object of the present invention to provide an improved current integrator which can accurately integrate currents as small as $10^{-12}$ ampere.

The above object has been accomplished in the present invention by system. improved charge-removal circuit. Voltage across a storage or integrating capacitor is monitored by an electrometer-type operational amplifier, the output of which triggers a discriminator at a given voltage level. The discriminator, together with a pulse shaper, generates reset pulses that have controlled amplitudes and widths which are utilized by the improved charge-removal circuit for effecting the removal of a fixed charge from the integrating capacitor for each of the reset pulses, thus returning the voltage across the capacitor to a level below the trigger threshold in a manner to be described hereinbelow. The operational amplifier is provided with a common-mode feedback for stabilization in the event of radiation damage which substantially improves the operation of the system. Other novel features of the present invention will become apparent upon a consideration of the following detailed specification.

DESCRIPTION OF THE PREFERRED EMBODIMENT

Figure 1:
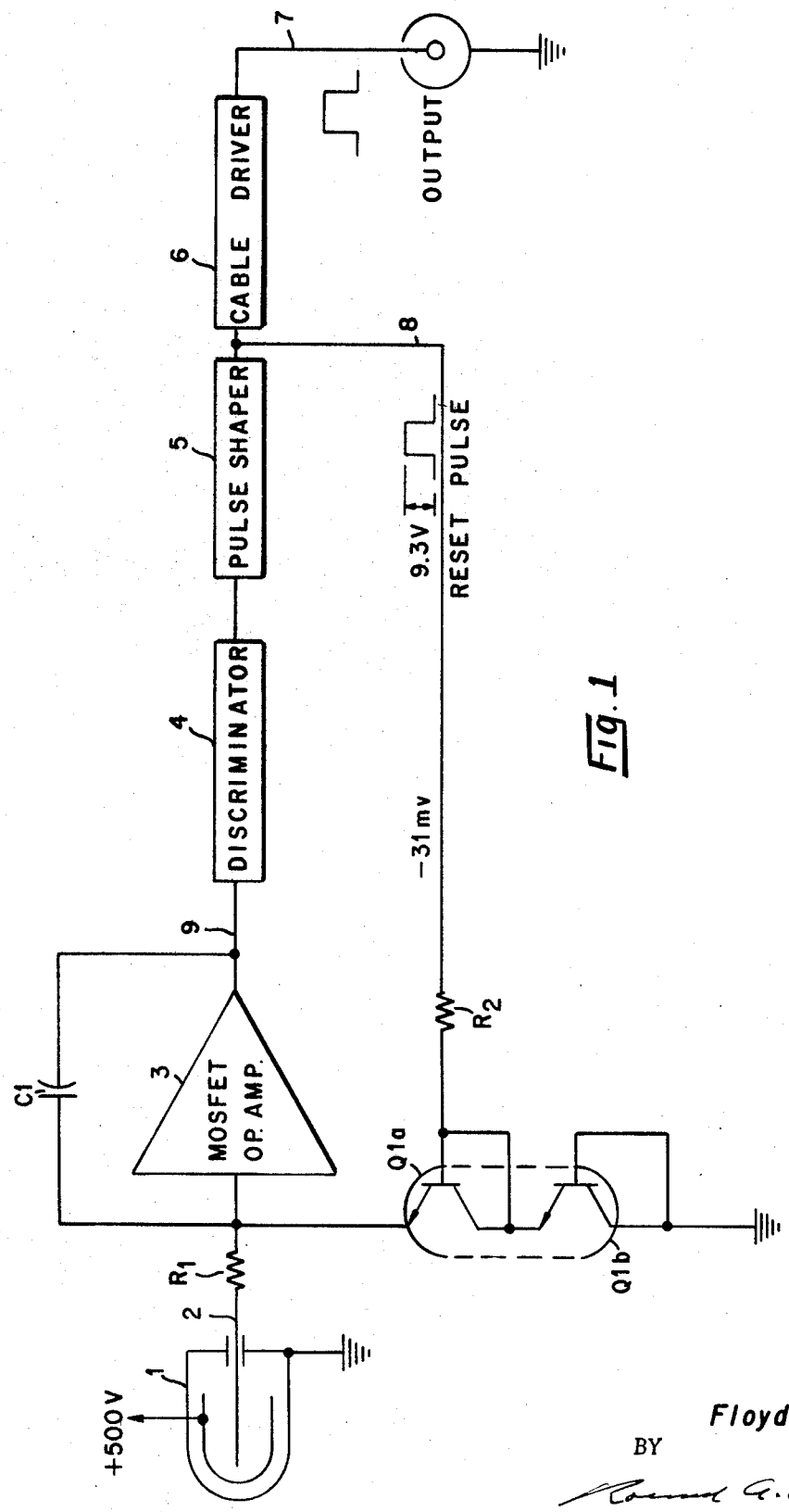
FIG. 1 is a block diagram of the present integrator system showing the charge-removal portion.

Referring to FIG. 1, the output of an ion chamber 1 is connected by a line 2 and a resistor R1 as an input to an electrometer-type operational amplifier 3. A storage or integrating capacitor C1 is connected across the amplifier 3, as shown, such that the voltage across the capacitor C1 is monitored by the amplifier 3. The output of the amplifier 3 is connected by a line 9 to a discriminator 4 such that the amplifier output triggers the discriminator at a given voltage level. The reset pulse output of the discriminator 4 is connected to a pulse shaper 5 whose output is connected by a lead 8 and a resistor R2 to a charge-removal transistor Q1a which is connected to the input of the integrating capacitor C1. The manner in which this is accomplished and the function of the transistor Q1b will be described hereinbelow in connection with FIG. 2.

The output of pulse shaper 5 is also connected by a cable driver 6 to an output line 7. Readout is accomplished by counting the reset pulse with a frequency counter, not shown, or by measuring the time interval between pulses with a time-intervalometer, not shown.

The required voltage gain in the amplifier 3 for the present system is quite modest. It may be seen that the amplifier 3 and the capacitor C1 form a Miller integrator. The system of FIG. 1 is calibrated to produce 1 pulse/sec. in a 0.5-R/hr. gamma field. With a 1,000-cc chamber and a 0.5-R/hr. field, the average ion current will be $0.468 \times 10^{-11}$ ampere. The input leakage resistance including the current switch Q1a and all the insulators is typically $10^{12}$ ohms. A maximum allowable leakage current of $5 \times 10^{-15}$ ampere was set as a goal with the amplifier 3 balanced to allow for some drift. This means the normal input voltage drift will not exceed $\pm 5$ mV. The amplifier gain is typically 125, which has proven adequate. Gain stability is relatively unimportant with the only requirement being that the gain remain sufficiently high to limit the input voltage to $\pm 5$ mV.

Figures 2, 3:
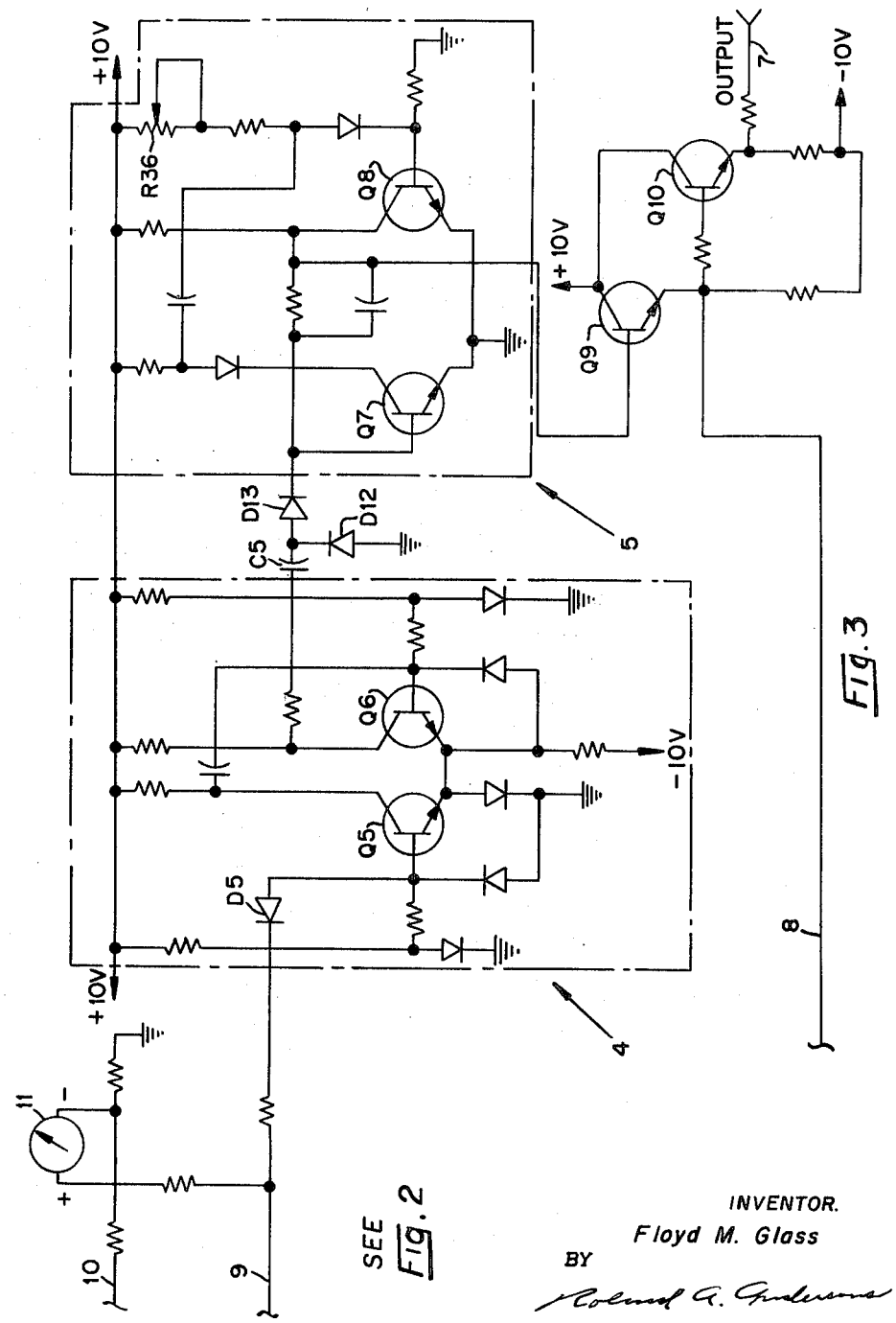
FIG. 2 is a detailed schematic diagram of the operational amplifier section, the charge-removal section, and also of the built-in test circuitry of the present invention.
FIG. 3 is a detailed schematic diagram of the discriminator and pulse-shaper portions of the present invention.

The input leakage should be at least three orders of magnitude less than the lowest ion current to be measured and preferably four orders of magnitude in order to assure acceptable leakage after aging and gamma irradiation. This low leakage is achieved in this invention as shown in FIG. 2 by employing a dual-enhancement-mode MOSFET transistor in the input of the operational amplifier. Transistors Q2a and Q2b serve as a high-impedance coupling to the two inputs of the amplifier 3 and constitute the dual MOSFET transistor. The transistors Q2a, Q2b gate leakage current is positive and ranges from $10^{-16}$ to $10^{-14}$ ampere, with $10^{-15}$ ampere being typical.

The present invention is intended for use in remote locations which make it imperative that the long-term differential voltage drift referred to the input of the amplifier 3 be reasonably low. A unique common-mode feedback circuit, including resistors R7, R8 and a dual transistor comprising transistors Q3a and Q3b, compares the average drain voltages of transistors Q2a and Q2b with ground and applies the amplifier error voltage to the base of a transistor Q4, which supplies current to the sources of transistors Q2a and Q2b. This common-mode feedback forces the average drain voltage of the transistors Q2a and Q2b to operate within a few millivolts of ground potential over a wide range of gate-source voltages. Typically, the drain current is 122 $\mu$a for the transistors Q2a and Q2b operating at a gate-source voltage of −4.3 volts. This voltage should theoretically double when the transistor Q1a is irradiated with $10^6$ R gamma, with most of the increase probably occurring before the transistor Q1a has received $10^5$ R gamma. However, the common-mode feedback forces the source voltage to make the necessary adjustment, thus allowing the gate voltage to remain at ground potential. This is necessary for maintaining low leakage.

Although the common-mode rejection to changes in the negative power supply voltage could be improved by replacing the resistors R5 and R6 with current sources, the power supply has sufficient regulation and the calibration is affected so little by small amplifier drifts that there would be little, if any, justification in complicating the circuitry.

The output of the operational amplifier is DC-coupled to a voltage-gated free-running multivibrator which serves as the discriminator 4 of the present invention. The discriminator 4 has no measurable hysteresis and can be triggered by its own internal noise when the DC voltage reaches the trigger threshold. Therefore, the operational amplifier 3 can be moderately slow without restricting the range of the over-all system. The bandwidth of the amplifier 3 is 13 kHz. The slewing rate, which might be a more meaningful term in this system, is 40 mV/$\mu$sec. Since the maximum reset pulse frequency is only 20 kHz, the 40-mV/$\mu$sec. slewing rate is more than adequate.

As stated above, the discriminator 4 is a voltage-gated free-running multivibrator (see transistors Q5 and Q6 in FIG. 3). In the absence of an inhibit signal (negative voltage on the cathode of diode D5) transistor Q5, as well as transistor Q6, is biased into conduction and the multivibrator runs freely at a frequency of 40 kHz. In normal operation, the discriminator 4 does not run freely as the inhibit signal is never removed for a period longer than 7 $\mu$sec. However, the free-running capability is necessary to prevent latch-up should a charge larger than that removed by a single reset pulse be accidentally discharged into the input.

In the quiescent or ungated state, the transistor Q5 is biased out of conduction by the output of the amplifier 3 holding the cathode of diode D5 at a negative potential in excess of −0.3 volt. When a negative current charges the integrating capacitor C1, the output of the amplifier rises linearly to a potential that no longer forward biases D5 and the base of transistor Q5 seeks the normal bias potential of approximately 0.65 volt. Transistor Q5 starts conducting and internal high frequency noise within the passband of the AC coupling triggers the discriminator. Within 7 $\mu$sec. from the time the discriminator is triggered, the reset pulse from the output transistor Q9 of the pulse shaper 5 over line 8 to the charge-removal transistor Q1a effects the removal of enough charge from the capacitor C1 such that the amplified and inverted signal appearing at the output of the amplifier 3 is sufficiently large to cut off the transistor Q5 and terminate the discriminator pulse. However, the reset pulse initiated by the discriminator and generated in the pulse shaper 5 continues to remove charge for the duration of the reset pulse, which is typically 13.7 $\mu$sec.

Since the discriminator pulse can be terminated by the gate inhibit signal, the discriminator cannot function as the reset pulse shaper. This function is performed by the trigger pair of transistors Q7 and Q8 which function as a saturated single-shot multivibrator. In most applications where precise width control is required, the trigger signal is injected at the collector of the transistor that is non-conducting and is capacitively coupled to the base of the transistor that is normally conducting. When a one-shot multivibrator is triggered in this manner, the output pulse is not as clean on the leading edge as it is when triggered with the opposite sign pulse at the base of the input transistor. In the present invention an inverter stage would also be required if the collector of the input transistor were the input to the pulse shaper. By differentiating the fixed amplitude pulses from the discriminator 4 (see capacitor C5) and employing DC restoration (see diode D12), the discriminator output can be coupled into the base of the transistor Q7 through diode D13 without influencing the width of pulses generated in the pulse shaper. The variable resistor R36 provides a means of calibrating the system by changing the width of the reset pulse.

The output of the trigger pair of transistors Q7 and Q8 is connected to a reset-pulse driver transistor Q9 whose output is connected by means of the line 8 to the base and collector junctions of the charge-removal transistor Q1a. The output of Q9 is also connected to a transistor Q10 whose output is connected by a line 7 to a suitable readout device, not shown, for counting the reset pulses or measuring the time interval between pulses.

The output of the amplifier 3 is monitored by means of a high-impedance voltmeter 11, for convenience in adjusting the output of amplifier 3 to the proper voltage. This adjustment is made by means of a potentiometer R9.

As stated hereinabove, precise charges are removed from the storage capacitor C1 by current pulses that have controlled amplitudes and widths. The transistor Q1a (see FIG. 2) which serves a the low leakage current switch is operated in the inverted mode. The inverted mode of operation is not obvious when the collector and base are at the same potential, but the transistor still has current gain. The total leakage to the emitter of the transistor Q1a is typically $3 \times 10^{-15}$ ampere. This leakage current is negative by virtue of the −31 mV bias provided by a voltage divider, including resistors R3 and R4, connected to the base and collector of transistor Q1a. The anode of the coupling diode D4 is also reversed biased except for the duration of the reset pulses. Consequently, the reverse bias on the current switch Q1a is not influenced by changes in the base-emitter voltage of the reset-pulse driver transistor Q9 of the pulse shaper network.

In the present system, stray capacitance has negligible effect on the charge transfer. Unfortunately, the current switch Q1a has a negative temperature coefficient, since the base-emitter voltage, when conducting, decreases about 2.2 mV/° C. This change has the same effect as increasing the amplitude of the reset pulse which results in more charge being removed from the integrating capacitor C1. The end result would be a change in calibration of 0.029%/° C. However, the pulse width of the reset pulse decreases with increases in temperature to compensate for the temperature coefficient of the current switch Q1a as well as other changes in the effective amplitude of the reset pulse.

The transistor Q1b is connected to the base and collector of transistor Q1a and is used to protect the transistor Q2a from destructive voltages by providing a shunt to ground for negative voltages greater than 1.2 volts and positive voltages in excess of 12 volts. This protection is accomplished without adding another parallel leakage path at the input.

Self-contained test circuitry is also provided in the present system and is shown in FIG. 2 of the drawings. This circuitry provides a means of performing tests essential to the operation of the system. These circuits include two fixed current sources for checking the calibration, a variable current source for simulating fallout patterns, and a grounding switch at the input for checking the amplifier balance.

One test current is $5 \times 10^{-11}$ ampere, which is roughly equivalent to the ion current from the 1,000-cc ion chamber in a 0.5-R/hr. gamma radiation field. The test switch S2 is utilized for actuating a relay K1 whose contacts close a circuit for providing this $5 \times 10^{-11}$ ampere test current, which is sufficiently small to detect the existence of small leakage currents. Since this test current is derived from the voltage divider R46, R47, and R47A across the 550-volt ion chamber supply and the series resistor R8, the 0.5-R/hr. calibration check also tests the 550-volt supply.

The test switch S1 is utilized to actuate the relay K2 whose contacts close a circuit through the calibrate position of a switch S4 to supply a test current of $5 \times 10^{-7}$ ampere, which current is roughly equivalent to a 5,000-R/hr. gamma radiation field. It should be noted that a remote switch S5 may also be utilized to actuate the relay K2. Also, the switch S4 is adapted to be positioned in a simulator position to connect the −10-volt supply through a potentiometer to the contacts of the relay K2 to provide a selectable (variable) test current source for simulating fallout patterns.

The test switch S3 is utilized to actuate the relay K3 whose contacts ground the input to the system to check the balance of the operational amplifier 3. The panel-mounted voltmeter 11 (FIG. 3) monitors the output of the amplifier 3 and provides a convenient check means when adjusting the balance control when the contacts of the relay K3 are closed. The components in the test circuitry as well as the current switch Q1a and operational amplifier 3 are kept immaculately clean in a sealed compartment filled with dry air. Teflon standoffs and feed-through insulators are used as sparingly as possible to keep the parallel shunt leakage low.

Regulated voltages of ±10 volts are provided for the above system by two identical power supplies. The regulators receive power from supplies that are floating by virtue of separate 14-volt windings on a transformer and separate bridge rectifiers. Each regulator utilizes a Fairchild µA723C integrated circuit in a foldback current limiting configuration that limits at about 80 ma. The low power supply voltages in the present system presented a real challenge. It would have been much easier to achieve stability with higher voltages such as ±24 volts or even ±12 volts. However, 10 volts is the highest voltage obtainable with adequate regulation when the source of unregulated power is a 12-volt storage battery, which is desirable for use with the present system where power failures occur.

A self-contained power supply provides 550 volts for saturating the ion chamber such as disclosed in U. S. Pat. No. 3,202,902. This supply consists of a blocking oscillator, half-wave rectifier, and a regulator. Regulation is accomplished by sampling the current through a corona regulator and holding the average current constant. The amplified error current is applied to the base of the blocking oscillator, thereby controlling the duty cycle of the oscillator in response to changes in the load and primary supply voltages.

The current integrator described above does not contain an inverter to permit operation on input signals of either sign, but it should be understood that one can be readily incorporated in the system in a manner similar to that described in my above-mentioned prior patent.

The advantages of the charge-removal technique employed in the present system, as described above, are low leakage, excellent linearity, predictable temperature coefficient, fast switching, and the capability of reliably removing very small charges, as low as $10^{-12}$ ampere, which is an order of magnitude lower than was achievable in my above-mentioned prior patent. The above features provide a wide current range without the necessity for range switching which was utilized in my above prior patent.

This invention has been described by way of illustration rather than limitation and it should be apparent that it is equally applicable in fields other than those described.

What is claimed is:

1. In a current integrator system for integrating an input current including an operational amplifier connected to said input, a charge storage capacitor connected in a feedback circuit across said amplifier, a discriminator connected to the output of said amplifier, and a pulse shaper connected to the output of said discriminator, the improvement comprising a charge-removal transistor circuit connected between the output of said pulse shaper and the input to said amplifier and capacitor, said transistor circuit including a low-leakage first transistor, a diode and a resistor connected in series between the output of said pulse shaper and the input to said first transistor, a voltage divider connected to the base and collector junctions of said first transistor and to the anode of said diode for normally reverse biasing these junctions and anode slightly, the output of said pulse shaper being connected by means of said diode and resistor to said base and collector junctions of said first transistor, an input circuit for providing a low input leakage to said system consisting of a dual-enhancement-mode MOSFET second transistor connected as a high-impedance coupling to the inputs of said operational amplifier, a common-mode feedback circuit including a voltage comparator dual third transistor and a current source fourth transistor for comparing the average drain voltages of said second dual transistor with ground and applying the amplifier error voltage to the base of said fourth transistor which supplies current to the sources of said second dual transistor, said common-mode feedback circuit forcing the average drain voltage of said second dual transistor to operate within a few millivolts of ground potential over a wide range of gate-source voltages for said first transistor, and a fifth transistor coupled to the collector and base of said first transistor and working in conjunction with said first transistor for providing protection for said second transistor from destructive voltages by providing a shunt to ground for negative voltages greater than 1.2 volts and positive voltages in excess of 12 volts, whereby each output pulse of a given height and width from said pulse shaper provides a reset pulse to said charge-removal circuit to remove said reverse biasing from the junctions of said first transistor, thereby effecting removal of a precise amount of charge from said charge storage capacitor for each such pulse shaper output pulse, such that said system is adapted to integrate currents as low as $10^{-12}$ ampere.

2. The system set forth in claim 1, wherein said low input leakage to said system is within the range from $10^{-16}$ to $10^{-14}$ ampere.

3. The system set forth in claim 2, wherein said discriminator includes a free-running multivibrator.

4. The system set forth in claim 3, wherein said pulse shaper includes a one-shot multivibrator, a variable resistor coupled to said one-shot multivibrator for setting the width of the output pulse therefrom, and a pulse driver transistor coupled to the output of said one-shot multivibrator for supplying said reset pulse to said charge-removing first transistor.

* * * * *